United States Patent [19]

Verhoeven

[11] Patent Number: 4,649,433
[45] Date of Patent: Mar. 10, 1987

[54] ARRANGEMENT FOR MAKING A PHOTOGRAPHIC SLIDE OR CINE-FILM RECORDING OF A TELEVISION PICTURE

[75] Inventor: Leonardus A. J. Verhoeven, Eindhoven, Netherlands

[73] Assignee: U.S. Philips Corporation, New York, N.Y.

[21] Appl. No.: 607,071

[22] Filed: May 4, 1984

[30] Foreign Application Priority Data

May 4, 1983 [NL] Netherlands ............... 8301566

[51] Int. Cl.⁴ .................................. H04N 5/84
[52] U.S. Cl. .......................................... 358/244
[58] Field of Search ............... 358/102, 230, 140, 242, 358/244, 244.1, 244.2, 280, 285

[56] References Cited

U.S. PATENT DOCUMENTS

| Re. 31,460 | 12/1983 | Dalton et al. | 358/140 |
|---|---|---|---|
| 1,955,899 | 4/1934 | Zworykin | 358/242 X |
| 2,274,098 | 2/1942 | Shore | 358/242 |
| 4,096,530 | 6/1978 | Plugge et al. | 358/244 |
| 4,127,873 | 11/1978 | Katagi | 358/242 X |
| 4,251,835 | 2/1981 | Eriksen | 358/244 |
| 4,258,393 | 3/1981 | Ejiri et al. | 358/280 X |
| 4,307,421 | 12/1981 | Smit | 358/244 X |
| 4,415,931 | 11/1983 | Dischert | 358/140 X |
| 4,482,919 | 11/1984 | Alston et al. | 358/244 X |
| 4,558,347 | 12/1985 | Pritchard et al. | 358/140 X |

FOREIGN PATENT DOCUMENTS 0070677 1/1983 Europe .

Primary Examiner—Raymond F. Cardillo
Assistant Examiner—Wayne R. Young
Attorney, Agent, or Firm—Thomas A. Briody; William J. Streeter; Leroy Eason

[57] ABSTRACT

A line structure correction circuit for reducing the visibility of the raster line structure of a television picture which is to be photographed. The picture information associated with each raster line in the television picture signal is repeated n-times, n being an integer at least equal to two. The raster-line information is applied to a television display device operated at the same line period as the picture signal but with an n-times longer picture or frame period, respectively, depending on whether the television picture is interlaced. A further improvement in the quality of the recording is obtained by forming the information in each raster line of the television picture from different combinations of the information associated with consecutive raster lines in the picture signal.

5 Claims, 2 Drawing Figures

FIGURE 2

| PICTURE SIGNAL LINE PERIOD | SWITCH 12 | OUTPUTS MULT. 14 | DELAY 13 | MULT. 15 | ADDER 16 |
|---|---|---|---|---|---|
| 1 | L1 | $\frac{1}{4}$-L1 | 0 | $\frac{3}{4}$-x0=0 | $\frac{1}{4}$-L1 |
| 2 | L1 | $\frac{1}{2}$-L1 | 0 | $\frac{1}{2}$-x0=0 | $\frac{1}{2}$-L1 |
| 3 | L1 | $\frac{3}{4}$-L1 | 0 | $\frac{1}{4}$-x0=0 | $\frac{3}{4}$-L1 |
| --- | --- | --- | --- | --- | --- |
| 4 | L1 | 1L1 | L1 | 0xL1=0 | L1 |
| 5 | L2 | $\frac{1}{4}$-L2 | L1 | $\frac{3}{4}$-L1 | $\frac{3}{4}$-L1+$\frac{1}{4}$-L2 |
| 6 | L2 | $\frac{1}{2}$-L2 | L1 | $\frac{1}{2}$-L1 | $\frac{1}{2}$-L1+$\frac{1}{2}$-L2 |
| 7 | L2 | $\frac{3}{4}$-L2 | L1 | $\frac{1}{4}$-L1 | $\frac{1}{4}$-L1+$\frac{3}{4}$-L2 |
| 8 | L2 | 1L2 | L2 | 0xL2=0 | L2 |
| 9 | L3 | $\frac{1}{4}$-L3 | L2 | $\frac{3}{4}$-L2 | $\frac{3}{4}$-L2+$\frac{1}{4}$-L3 |
| 10 | L3 | $\frac{1}{2}$-L3 | L2 | $\frac{1}{2}$-L2 | $\frac{1}{2}$-L2+$\frac{1}{2}$-L3 |
| 11 | L3 | $\frac{3}{4}$-L3 | L2 | $\frac{1}{4}$-L2 | $\frac{1}{4}$-L2+$\frac{3}{4}$-L3 |
| 12 | L3 | 1L3 | L3 | 0xL3=0 | L3 |
| 13 | L4 | $\frac{1}{4}$-L4 | L3 | $\frac{3}{4}$-L3 | $\frac{3}{4}$-L3+$\frac{1}{4}$-L2 |

ARRANGEMENT FOR MAKING A PHOTOGRAPHIC SLIDE OR CINE-FILM RECORDING OF A TELEVISION PICTURE

BACKGROUND OF THE INVENTION

1. Field of the Invention

The invention relates to an arrangement for making a photograph, photographic slide or cine-film recording of a television picture, the arrangement comprising a television picture signal source for producing a picture signal with line and picture field or picture frame periods, a television display arrangement having a picture display screen and receiving the picture signal to display a raster line television picture, a photographic, slide or cine-film camera directed towards the picture display screen for photographing the television picture, and a line structure correction circuit for reducing the visibility of the raster line structure of the television picture.

2. Description of the Related Art

Such an arrangement is proposed in U.S. Pat. No. 4,096,530. Without the use of the line structure correction circuit the raster lines of the television picture would be visible in a distracting manner in the photograph, photographic slide or cine-film recording. Multiple interlace has been proposed to correct this. The said Patent proposes, starting from a single interlaced picture such as produced in accordance with television standards, to shift for each picture or frame period (which includes two field periods) the vertical scan of the raster in an incremental sequence. By way of example, a shift of 4 $\mu$s during 16 frames is mentioned which for a line period equal to (approximately) 64 $\mu$s results in a total shift over the distance of one line width. After 16 shifted frames, that is to say after 32 field rasters, the television picture thus formed by multiple interlace is converted to the photograph, photographic slide or cine film recording.

Practical experience has taught that such multiple interlace is only partly effective. Very slight deviations from the ideal shift pattern result in the line structure becoming visible again in the picture. These deviations may for example, be caused by: non-stable synchronization during the scan; mutual influencing of the line or horizontal deflection and the field or vertical deflection of an electron beam producing the television picture; magnetic stray fields in the case of magnetic electron beam deflection; disturbances of supply voltages and supply currents; disturbances of the anode high voltage of the picture display tube comprising the display screen; etc.

SUMMARY OF THE INVENTION

The invention has for its object to provide an arrangement for making a photograph, photographic slide or cine-film recording of a television picture, comprising a line structure correction circuit, in which the above described problems do not occur. According to the invention, such an arrangement is characterized in that the line structure correction circuit is coupled to the picture signal source and produces consecutively during the said line periods, at least n-times, the picture information associated with each television line of the raster. Such circuit is further coupled to the television display arrangement to produce in the display a picture period which is equal to n-times the picture period originally produced by the picture signal source, the number n being an integer at least equal to two.

As during the making of the photograph, photographic slide or cine-film recording only one single picture scan or frame scan with a standardized single interlaced picture is effected, the problems inherent in multiple interlace no longer occur. During the vertical scan at the n-times longer period each television line is displayed n-times with an unchanged line period and the lines are submitted to a vertical shift over the distance of the line width.

A further improvement of the quality of the recording can be obtained by interpolation in the vertical direction in, and is provided by embodiment of the invention in which the line structure correction circuit causes the picture signal source to supply consecutively (2n−1)-times, simultaneously with the picture information associated with two consecutive television lines of the raster, the picture information associated with the preceding and the subsequent television lines. A combining circuit in the line structure correction circuit adds such picture information together using multiplying factors which change once per line period for simultaneously occurring picture data, such combining circuit preceding the display arrangement.

Optimal vertical interpolation may be achieved by using multiplying factors which are varied during the (2n−1) repetitions of each television line in accordance with the series $$\frac{1}{n}, \frac{2}{n}, \frac{3}{n}, \ldots, \frac{n}{n},$$

and the complementary series $$\frac{n-1}{n}, \frac{n-2}{n}, \ldots, \frac{1}{n}.$$

A further embodiment of the invention, in which the picture data to be added together can be obtained in a simple way, is characterized in that the line structure correction circuit comprises a delay device for the picture information, producing a time delay equal to (n−1) line periods.

So as to obtain the picture information repeatedly over the n line periods, an embodiment of the invention is characterized in that the picture signal source comprises a repeatedly readable memory.

The invention includes a switching arrangement which can be optionally switched-on and off, in the switched-off state it being possible to observe the picture display screen directly and the switching operation resulting in a minimal modification of the raster scan. In such an arrangement the television display comprises a raster deflection circuit in which, by means of a switching circuit, an integrating capacitance which provides the electron beam vertical deflection in a picture display tube can be changed by the factor of n.

BRIEF DESCRIPTION OF THE DRAWINGS

The invention will now be described in greater detail by way of example with reference to the accompanying drawings, in which:

FIG. 2 is a timing diagram of the operation of the circuit in FIG. 1.

In FIG. 1, which shows an arrangement for making a photograph, photographic slide or cine-film recording of a television picture, reference numeral 1 denotes a time signal generator (TG) and reference numeral 2 a control unit (CU) for this generator. The generator 1 has a plurality of outputs and inputs at which signals occur which are coupled to each other. An output of the generator 1 is connected to a control input of a memory (M) denoted by reference numeral 3. By way of example, the memory 3 is in the form of a digital memory in which m denotes any of the memory locations. For the sake of simplicity, the memory 3 is shown as having a bi-dimensional construction in which the memory locations m are arranged in rows and columns. Let it be assumed that the rows of memory lcoations m can be read serially, non-destructively and repeatedly. Each row of memory locations can, for example, be read in a period TH which is equal to one television line period. The picture information of one television line is stored in one row of memory locations. The number of rows is equal to the number of television lines from which the television picture is formed as a line raster. At the memory 3, TV denotes a picture field period and TP=2TV denotes a picture frame period for the case where a single interlaced television picture frame formed in two field periods is stored. Let it be assumed that when data associated with a non-interlaced television picture is stored the field period TV is associated therewith, and that a picture frame period TP is associated with, for example, a single frame of a standard interlaced picture.

Figure 1:
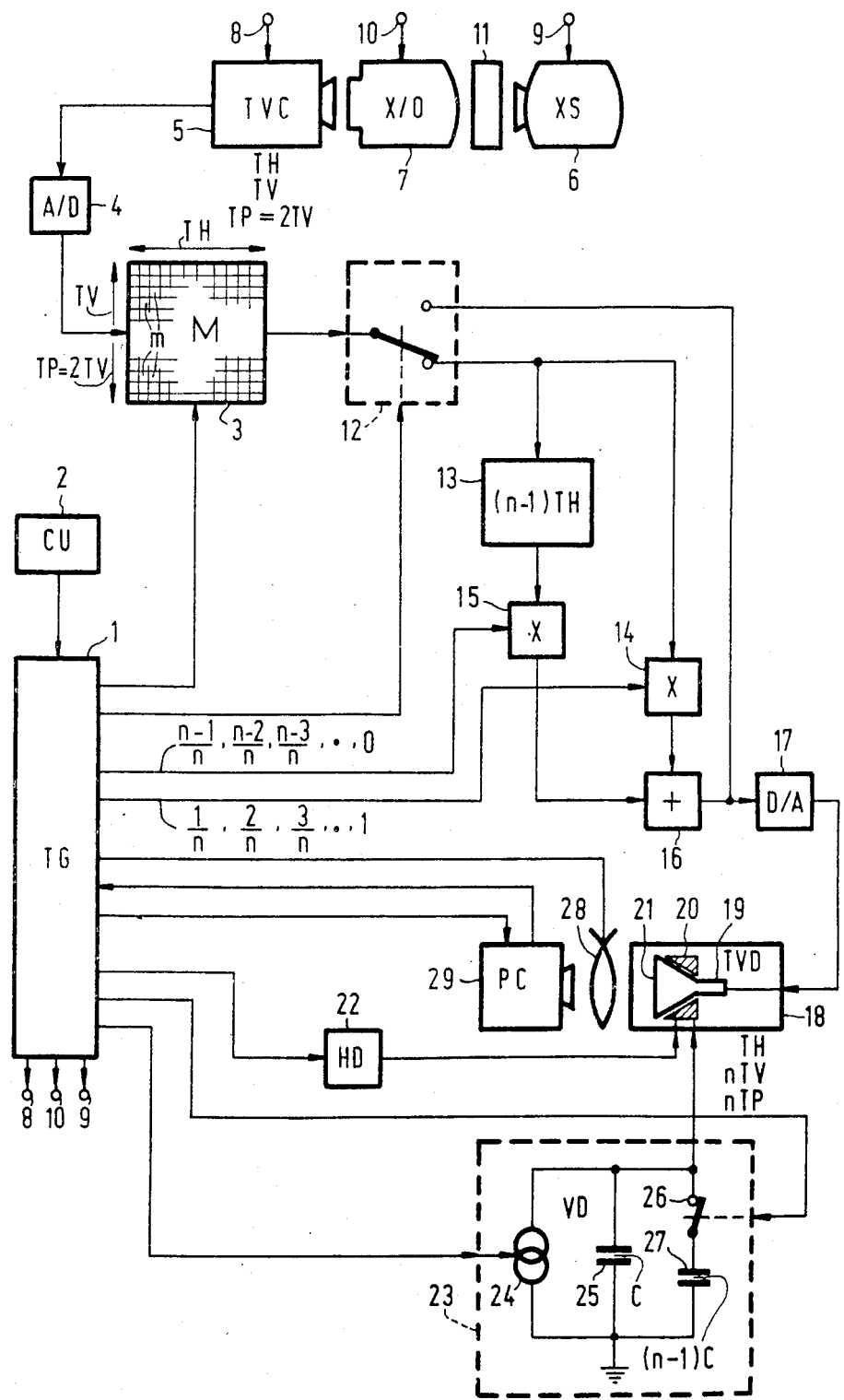
FIG. 1 shows in block-schematic form an arrangement according to the invention.

The picture information to be stored is received from a television camera (TVC) 5 via an analog-to-digital converter (A/D) denoted by reference numeral 4. The camera 5 produces an analog picture signal with a line period TH and, optionally, a picture period TV or a picture frame period TP=2TV. By way of example, the camera 5 is combined with an X-ray source (XS) denoted by 6 and an X-ray image intensifier and optical converter (X/O) denoted by 7. At the camera 5, the X-ray source 6 and the converter 7, the respective terminals 8, 9 and 10 thereof are indicated which are connected to similarly denoted terminals of the time signal generator 1 and which serves to supply control and/or supply voltages. Reference numeral 11 denotes an object or part of the body of a person to be examined. In known manner, the X-ray television arrangement (5–10) operates with single or continuous X-ray recording, with a standarized or non-standardized, interlaced or non-interlaced television picture which would be produced on display of the picture signal produced by the camera 5.

Together with the time signal generator 1 and the control unit 2 the memory 3 forms a digital picture signal source (1, 2, 3). A digital picture signal-carrying output of the memory 3 is connected to a contact of a switching circuit 12. For the sake of simplicity the circuit 12 is shown as a mechanical switch with two selection contacts. In practice the switching circuit 12 will be in the form of an electronic switch controlled by a switching signal from time signal generator 1. One selection contact of the switching circuit 12 is connected directly and via a delay device 13, respectively, to an input of respective multipliers (X) 14 and 15. The delay device 13 has a time delay equal to $(n-1)$ line periods TH, the number n being an integer at least equal to two. From the time signal generator 1 a series of multiplying factors denoted by $$\frac{1}{n}, \frac{2}{n}, \frac{3}{n}, \ldots, 1$$

is applied to the multiplier 14 which are present during one line period TH. A complementary series of multiplying factors is simultaneously applied to the multiplier 15, which series is denoted by $$\frac{n-1}{n}, \frac{n-2}{n}, \frac{n-3}{3}, \ldots, 0.$$

The outputs of the multipliers 14 and 15 are connected to inputs of an adder (+) denoted by 16. The output of the adder 16 and the other selection contact of switching circuit 12 are connected to an input of a digital-/analog converter (D/A) denoted by 17. As will be apparent from the further description of FIG. 1, the components 1, 2, and 12 to 16, inclusive, form a line structure correction circuit (1, 2, 12–16) in accordance with the invention. For the line structure correction circuit (1, 2, 12–16) a choice can be made between two modes of operation by means of the switching circuit 12. The simplest mode is a direct interconnection of the digital picture signal source (1, 2, 3) to the converter 17, the insertion of the combining circuit (13–16) resulting in a more complicated operating mode.

The output of the converter 17 constitutes the output of the analog television picture signal source (1, 2, 3, 17) and this output is connected to a television display device (TVD) denoted by 18. The display device 18 comprises, shown schematically a display tube 19, a deflection device 20 for horizontal line deflection and raster or vertical deflection of an electron beam generated in the tube 19, and a picture display screen 21 which is scanned by the electron beam. The time signal generator 1 is connected to the deflection device 20 via a horizontal line deflection circuit (HD) denoted by 22. Reference numeral 23 denotes a raster or vertical deflection circuit (VD) which is shown schematically in greater detail in order to describe of the operation of the arrangement in FIG. 1. Circuit 23 is shown as comprising a current source 24 to which a first capacitor 25 and a series arrangement of a switch 26 and a second capacitor 27 are arranged in parallel. The capacitance of the capacitor 25 is denoted by C, the capacitance of the capacitor 27 being equal to $(n-1)C$. The current source 24 and the switch 26 are controlled from the time signal generator 1. That output of the current source 24 which is not connected to ground is connected to the deflection device 20. The components 1, 2, 18 to 27, inclusive form together a television display arrangement (1, 2, 18–27). When the switch 26 is in the switched-off or open state the display arrangement (1, 2, 18–27) is operative in known manner with the horizontal period TH and the vertical period TV. The current source 24 applies a constant current to the capacitor 25, with a lower value during the vertical scanning period and with a higher value during the vertical flyback period, so that a sawtooth-shaped voltage during the vertical period TV is supplied to the vertical deflection coils of the deflection device 20, such voltage being produced across the capacitor 25. When in accordance with one aspect of the invention the switch 26 is switched on, an integrating capacitance (25–27) having an n-time higher value then capacitance C is present in parallel with the current source 24. For this reason, to reach the same amplitude value of the sawtooth voltage across the capacitors 25 and 27 an n-times longer period of time is required, which results in a vertical period of nTV. However, the horizontal period is not changed and remains equal to TH. In the case of interlaced deflection a picture frame period nTP is therefore obtained. In FIG. 1 the switch 26 is shown in the switched-on state, causing display device 18 to be operative at the unchanged line period TH and the extended picture field and frame periods nTV and nTP, respectively. Consequently, during the line period TH the vertical scan is effected over $1/n^{th}$ portion of the distance covered by the electron beam in the display tube 19 when switch 26 is in the switched-off state. The n-times repeated television lines are then submitted to a shift over a distance of the line width.

A television picture which can be recorded by a photographic slide or cine-film camera (PC) 29 via an optical shutter 28 controlled from the time signal generator 1 is present on the display screen 21. The camera 29 is, for example driven from the time signal generator 1 and returns, for example, a signal to the generator when taking a picture of the television image is started and ended.

To explain the operation of the arrangement shown in FIG. 1 let it be assumed that the switch 26 is in the position shown and the switching circuit 12 is in the position, opposite to that shown. In addition, that the memory 3 has stored therein information associated with an interlaced or non-interlaced television picture, as the case may be. The time signal generator 1 controls the memory 3 such that the information in each row of memory locations m is repeatedly read n times at the rate of the line period TH. The analog picture signal source (1, 2, 3, 17) applies the picture signal to be displayed to the television display arrangement (1, 2, 18–27), which is operative with the line period TH and an extended picture field period nTV or picture frame period nTP, respectively. The television picture on the display screen 21 is recorded by the photographic slice or cine-film camera 29 via the shutter 28. The results is a recording of the television picture without a distracting line structure.

If now the switching circuit 12 is adjusted to the position shown, then the combining circuit (13–16) becomes operative in the line structure correction circuit (1, 2, 12–16). By way of example, let it be assumed that for the number n it holds that n=4. In addition, that L1, L2, L3, L4 etc. signify the line data supplied by the memory 3, and the data for each line is repeated seven times because of the four line repetitions and the delay by three line periods in delay device 13. After multiplication in the multipliers 14 and 15 by the series of multiplying factors $\frac{1}{4}, \frac{1}{2}, \frac{3}{4}, 1$ and the complementary series of multiplier factors $\frac{3}{4}, \frac{1}{2}, \frac{1}{4}, 0$, respectively, the data are added by the adder 16 and result in the following combinations of line data in successive line periods:

$L1, (\frac{3}{4}L1 + \frac{1}{4}L2), (\frac{1}{2}L1 + \frac{1}{2}L2), (\frac{1}{4}L1 + \frac{3}{4}L2), L2,$ $(\frac{3}{4}L2 + \frac{1}{4}L3), (\frac{1}{2}L2 + \frac{1}{2}L3), (\frac{1}{4}L2 + \frac{3}{4}L3), L3, (\frac{3}{4}L3 + \frac{1}{4}L4),$ etc., after a run-in interval of three lines. This operation can be seen in the timing diagram in FIG. 2. Compared with this operation of the line structure correction circuit (1, 2, 12–16), when the switching circuit 12 is in the other position, the series of line data L is then: L1, L1, L1, L1, L2, L2, L2, L2, L3, L3 etc. Thus, the correcting circuit produces an interpolation in the vertical direction which leads to a further improvement in picture quality. In summary, structure correction circuit (1, 2, 12–16) supplies consecutively $n+n-1=(2n-1)$-times, the picture information associated with each television line of the raster, such picture information being repeated (n−1) times simultaneously with the picture information associated with the preceding line and also with that associated with the subsequent television line. Instead of using a delay device 13 producing the time delay equal to (n−1) TH the memory 3 might be of such a construction that it has two outputs at which the data of consecutive lines become available.

In FIG. 1 the analog picture signal source (1, 2, 3, 17) comprises the digital, repeatedly readable memory 3, and the memory information is received from the television camera 5. Instead of this construction it is alternatively possible to have the television camera 5 produce the repeated line information directly. Then the camera 5 may comprise a solid state pickup device of the charge injection type which is repeatedly readable. In addition, the memory 3 may comprise repeatedly readable disc or tape pick-up and display devices. X-ray imaging has only been described as one possible field of application. A further field of application is e e for filling purposes.

In the FIG. 1 the raster or vertical deflection circuit 23 is shown in a simplified version so as to obtain the extended picture field periods nTV, and frame periods nTP, using only the capacitor 27 and the switch 26. When the switch 26 is in the switched-off state the television picture can be visually observed on the display screen 21.

What is claimed is:

1. In an arrangement for making a photographic recording of a television picture corresponding to a picture signal having raster line and picture periods, such arrangement comprising a television display device having a picture display screen and producing thereon a line raster in accordance with the picture signal, and a photographic camera directed towards the display screen for photographing the television picture thereon; the improvement consisting of a line structure correction circuit for reducing the visibility of the raster line structure of the television picture, such line structure correction circuit comprising:

means for storing the picture information in successive raster line periods of the picture signal;

signal processing circuit means for supplying to said television display device, in at least "n" consecutive raster line periods of the television picture displayed thereon, the stored picture signal information associated with each raster line of the picture signal; the raster line periods of the displayed television picture being the same as the raster line periods of the picture signal; and a vertical deflection circuit coupled to the television display device for producing the picture period of the television picture displayed thereon, such picture period being equal to "n"-times the picture period of said picture signal, the number "n" being an integer at least equal to two;

whereby the picture information in each raster line of the picture signal is repeated in at least "n" successive raster lines of the picture on the display screen of the television display device.

2. A line structure correction circuit as claimed in claim 1, characterized in that said signal processing circuit means supplies consecutively (2n−1)-times to said picture display device the picture information associated with each raster line of the television picture signal, the picture information of each line being repeated (n−1)-times simultaneously with the picture information associated with the immediately preceding and immediately succeeding raster lines, respectively, of the television picture signal; said signal processing circuit means comprising a combining circuit for adding together the simultaneously occurring information in such raster line periods multiplied by respective predetermined factors which change for successive raster line periods.

3. A line structure correction circuit as claimed in claim 2, characterized in that said multiplying factors are varied over said (2n−1) raster lines in accordance with the sum of a first series $$\frac{1}{n}, \frac{2}{n}, \frac{3}{n}, \ldots,$$

and the complementary series $$\frac{n-1}{n}, \frac{n-2}{n}, \frac{n-3}{n}, \ldots \frac{1}{n}.$$

4. A line structure correction circuit as claimed in claim 2 or 3, characterized in that said signal processing circuit means comprises a delay device coupled to said picture information storing means for delaying the stored picture information for each raster line of the television picture by a time delay equal to (n−1) raster line periods thereof.

5. A line structure correction circuit as claimed in claim 1, wherein said vertical deflection circuit comprises a switching circuit and an integrating capacitance, such switching circuit controlling such capacitance so that the vertical deflection period of said picture display device can be changed by the factor of "n".

* * * * *